3,305,379
PAVING EMULSION MIXES WITH SAND
Richard L. Ferm, El Cerrito, Calif., assignor to Chevron Research Company, a corporation of Delaware
No Drawing. Filed Sept. 11, 1963, Ser. No. 308,066
3 Claims. (Cl. 106—277)

The present invention relates to the preparation of improved bituminous emulsions useful in the paving and repair of highways and roads, and is particularly concerned with the prevention of stripping of the bituminous binder from the surface of finer aggregates, and specifically of sand, in the course of mixing these aggregates with the emulsified bitumen.

Mixes of emulsified bitumen and aggregate, such as sand, are used in the paving art to coat road surfaces, to prevent sandblow or drift, to protect road embankments, slopes of levees and canals, etc. The advantage of utilizing such mixes lies in the elimination of the necessity of heating the bitumen (usually asphalt) in order to mix it satisfactorily with sand, and in the possibility of preparing the desired mix at the plant in a large-scale plant mixer, thereafter transporting this mix to the job site without necessity of maintaining the mix in a heated state while in the truck on the way to the job. Also, the mixing operation may take place at the job site, using in this instance either the blade of a road grader to mix the emulsion with sand, or resorting to a "roto-tiller," or yet mixing the components in a pug mill and spreading the resulting mix over the road surface by any suitable known technique, e.g. from a continuous spreader, with drag brooms, or manually with shovels and rakes.

However, considerable difficulties are experienced by the applicators of paving emulsion mixes prepared with sand, because the binder film, which at the beginning of the mixing operation appears to encase and to adhere firmly to the surface of sand particles, tends to strip away on continued mixing. Apparently, this is not solely due to the effect of mechanical agitation of the mix, and the nature and origin of each particular sand type seems to be a definite factor contributing to stripping. In any event, very often the application of these emulsion-sand mixes yields unsatisfactorily and uneconomically disappointing results.

I have found that this stripping tendency can be largely reduced and even completely eliminated by introducing into the emulsion of bitumen, intended for the operation of a paving mix, a small quantity of more than 0.25 to about 5.0%, by weight, based on the final emulsion, of a sulfur-containing salt selected from the group consisting of ammonium thiocyanate, potassium thiocyanate, ammonium thiosulfate, and potassium thiosulfate. Preferably, the quantity of the aforementioned salts, which counteracts the stripping tendency of the bituminous binder, lies in the range from about 0.5 to about 5.0% by weight, based on the final emulsion. Furthermore, the salt is preferably added to the aqueous phase prior to the emulsification of the bitumen.

The paving-type emulsions contemplated by the present invention may contain from about 50 to about 75% by weight, of bitumen, such as an asphalt of Venezuelan origin, for instance, the so-called Boscan asphalt. However, actually, the type (origin) of the asphalt is not critical with respect to the beneficial effect of the sulfur-containing salt additive on the stripping tendency of the emulsified binder. Water-in-oil type emulsions of any asphalt, having a penetration in the range from about 85 to about 300 and capable of being emulsified in water on addition of known emulsifying agents (except metal salts of simple, unsubstituted carboxylic and sulfonic acids, i.e. salts containing only carboxyl and sulfonic acid groups), may be improved according to the invention so as to deposit on the surface of the particles of sand, a persistent film which remains virtually intact during the mixing and subsequent spreading operations. The addition of the thiocyanates and thiosulfates is particularly effective in asphalt emulsions prepared with emulsifiers containing amino or imino groups (amide or imide salts).

The particular thiocyanates and thiosulfates to be used as antistripping additives (adhesion aids) according to the present invention are found to be effective in bituminous emulsions with pH ranging from as low as 2.0 to as high as 11.0. Emulsion pH's from about 5 to about 9 are most propitious for reducing effectively the tendency of the bituminous binder to strip off from sand particles.

The bituminous emulsions mixed with sand may also contain other additives, known in the art of bituminous paving emulsions and conventionally added to improve certain desirable properties of such emulsions. The sole condition governing introduction of such additives is that they do not adversely affect the benefits inuring from the use of sulfur-containing salts according to the invention. These additives include conventional hydrocarbon cutter stocks, such as petroleum naphtha, in amounts which may range from about 5.0 to about 15.0% by weight, without interfering with the operativeness and quality of the emulsions, while assisting in handling and mixing the sand and emulsion components, and in applying the final mixed materials in paving work.

The specificity of the particular sulfur-containing salts in abating the tendency of bituminous binder to strip away from the surface of sand on continued, extended mixing is totally unexpected. Water-soluble salts in minor amounts of 0.25% by weight, and less have been employed in the past to improve the quality and performance (including initial adhesion to the aggregate) of bituminous emulsions. One might have, therefore, expected that all water-soluble salts, and, more particularly, all water-soluble thiocyanates and thiosulfates, would be effective in sand-emulsion mixes. This is, however, not the case. In fact, sodium and lithium thiocyanates and thiosulfates are ineffective for the prevention of stripping of the binder from sand particles, even though these salts are used in amounts way in excess of 0.25%, by weight. On the other hand, the ammonium and potassium thiocyanates and thiosulfates are very effective in this respect and prevent stripping of asphalt from the particles of sand when employed in amounts from 0.25 to 5.0%, and preferably in amounts from about 0.5 to about 5.0% by weight. This is clearly apparent from the following illustrative and comparative test data.

TEST SERIES I

In this series, several mixing-grade (SS) asphalt emulsions were used. In each test, an aliquot (1.25% by weight) of either thiocyanate or a thiosulfate was added to the emulsion as a 10% by weight solution of the salt in water. Thus each 100 g. of the emulsion received 14.3 g. of the salt solution.

The resulting mixture of asphalt emulsion and salt solution was then subjected to a specially designed "Sand-Mixing Test" which determines the ability of an emulsion to mix with and to coat the sand granules thoroughly and uniformly and furnishes a measure of the tendency of the asphalt to strip off during the mixing period.

A difficult-to-coat sand of Maryland origin (from Anne Arundel County) was used in all tests, the dried sand being first wetted with 5% of water. The emulsions have been pre-blended with a hydrocarbon cutter stock (naphtha) to facilitate handling, from 10 to 15% of the cutter stock being thus used before mixing the emulsion with the sand. Throughout the test the temperature of the sand and emulsion was maintained at about 120° F.

465 g. of wet sand was weighed in a metal kitchen mixing bowl (8⅜" I.D. and 6" deep), and 35 g. of the asphalt emulsion containing the naphtha and the salt solution was added thereto; the whole was mixed at slow speed with an oscillating wire beater. The mixer was stopped after one minute, and a small sample (25 g.) removed. The mixing was resumed and continued at slow speed for two more minutes, whereupon another small sample of the mix was taken. Then the mixing was resumed again at higher (2nd) speed for an additional minute, whereupon a new sample was taken. Finally, the mixing was resumed and continued for another minute at the highest (3rd) speed, and the final sample was then withdrawn. All the samples were evaluated as to the effectiveness of asphalt coating on sand particles. The effect of addition of ammonium and potassium salts according to the present invention is clearly illustrated by the results of two tests which employed the following two emulsions, A and B, respectively.

*Emulsion A*

Weight percent

Oil phase.—Asphalt of 120/150 penetration of California (Midway) origin _____ 70

Emulsifier:
"Arquad T–50," a 50% solution in isopropanol of trademarked cation-active tallow trimethyl ammonium chloride _____ 0.276
In combination with "Duomeen T," a trademarked tallow-substituted propylene diamine emulsifying base _____ 0.284
And a small amount (less than 0.06%) of polyethoxy rosin amine to improve mixing with sand; plus enough hydrochloric acid (20° Bé.) to give a pH of about 6.5.

Aqueous phase. — Water to make up 100% by weight of the emulsion. In addition, petroleum naphtha in an amount of 15% by weight was added to this emulsion.

*Emulsion B*

Oil phase. — The same California (Midway) asphalt as above _____ 65

Emulsifier:
Cation-active emulsifying imidazoline base sold under the trademark "Nalcamine G–39M" _____ 0.4
And enough hydrochloric acid (20° Bé.) to give a pH of 6.5.

Aqueous phase. — Water to make up 100% by weight. Petroleum naphtha in an amount of 10% by weight was also added to this emulsion.

To emphasize the benefits resulting, in accordance with the invention, from the addition to bituminous emulsions of from above 0.25 to about 5.0, and preferably from about 0.5 to about 5.0% by weight of thiocyanate or thiosulfate, parallel test runs were carried out, without addition of any salts at all, and adding to the emulsion sodium thiocyanate, potassium ferrocyanide and potassium oxalate. Potassium ferrocyanide and potassium oxalate are well known as iron-complexing agents, the same as generally assumed to be the case of thiocyanates. Thus, one could have expected these two last-mentioned salts to be effective in mixes of asphalt emulsions and sands which usually contain a certain, often appreciable, percentage of iron.

The following Table I, however, clearly points to the contrary and, unexpectedly and unmistakably, brings out the superiority of potassium ammonium thiocyanates as compared with sodium thiocyanate, particularly under the conditions of severe mixing.

TABLE I

| Test No. | Emulsion | Salt Added | Percent of Sand Surface staying coated after— | | | |
|---|---|---|---|---|---|---|
| | | | 1 min. | 3 min. | 4 min. | 5 min. |
| 1 | A | None | 90 | 85 | 80 | 60 |
| 2 | A | K₃Fe(CN)₆.3H₂O | 95 | 90 | 80 | 30 |
| 3 | A | K₂C₂O₄.H₂O | 95 | 90 | 70 | 50 |
| 4 | A | KCNS | 90 | 85 | 80 | 80 |
| 5 | A | NaCNS | 85 | 80 | 70 | 40 |
| 6 | A | NH₄CNS | 95 | 90 | 85 | 85 |
| 7 | B | None | 75 | 65 | 60 | 45 |
| 8 | B | K₃Fe(CN)₆.3H₂O | 80 | 60 | 40 | 30 |
| 9 | B | K₂C₂O₄.H₂O | 85 | 50 | 40 | 40 |
| 10 | B | KCNS | 85 | 85 | 80 | 75 |
| 11 | B | NaCNS | 80 | 80 | 75 | 50 |
| 12 | B | NH₄CNS | 80 | 85 | 80 | 75 |

TEST SERIES II

For another series of tests an emulsion of 65% by weight of a Venezuelan (Boscan) asphalt of 200/300 penetration in water was used. The emulsifier was a partial sodium salt of N-lauryl-β-iminodipropionic acid, a commercial amphoteric material sold under the trademark designation "Deriphat 160C." The pH of the aliquot samples of this emulsion used in these tests was adjusted by adding to the emulsifying water, which contained 0.5% by weight of Deriphat, enough dilute hydrochloric acid or dilute sodium hydroxide to give either an anionic- or a cationic-type emulsion. Two different thiocyanates, lithium thiocyanate and ammonium thiocyanate were employed in two parallel comparison test series in amounts equal to 1% by weight. The unique ability of the ammonium and potassium salts to enhance and to maintain the coating of sand particles again stood out in sharp contrast to the inadequate effect of lithium and sodium thiocyanates.

The results of these two separate, parallel series of tests of emulsion samples with pH values of 4.5, 5.5, 6.5, 7.5, and 8.5, following the Sand-Mixing Test described hereinbefore, appear in Table II. The salt, in each case, was added to the water phase and the pH adjusted prior to the emulsification.

Two different kinds of sand were used in this test. One was a difficult-to-coat sand of Maryland origin (from Anne Arundel County) used in Test Series I; the other was a relatively easy-to-coat sand of California origin (Del Monte). In all cases, 10% by weight of petroleum naphtha was blended with each emulsion sample prior to the actual test. The same testing procedure as described under Test Series I was followed in this instance.

TABLE II

| Emulsion pH | Salt Addition | Anne Arundel Sand percent coated after— | | | | Del Monte Sand percent coated after— | | | |
|---|---|---|---|---|---|---|---|---|---|
| | | 1 min. | 3 min. | 4 min. | 5 min. | 1 min. | 3 min. | 4 min. | 5 min. |
| 8.5 | NH₄SCN | 75 | 70 | 60 | 50 | 80 | 60 | 50 | 40 |
| 7.5 | NH₄SCN | 75 | 75 | 65 | 60 | 95+ | 95 | 90 | 80 |
| 6.5 | NH₄SCN | 60 | 70 | 70 | 60 | 95+ | 95 | 95 | 90 |
| 5.5 | NH₄SCN | 60 | 65 | 65 | 60 | 95+ | 95 | 90 | 90 |
| 4.5 | NH₄SCN | 60 | 60 | 55 | 55 | 95+ | 95 | 95 | 95 |
| 6.5 | None | 60 | 70 | 50 | 20 | 90 | 95 | 100 | 95 |
| 8.5 | LiSCN | 70 | 60 | 40 | 40 | 80 | 70 | 50 | 40 |
| 7.5 | LiSCN | 65 | 60 | 50 | 40 | 80 | 60 | 50 | 40 |
| 6.5 | LiSCN | 65 | 60 | 50 | 40 | 85 | 65 | 50 | 40 |
| 5.5 | LiSCN | 65 | 55 | 40 | 30 | 85 | 70 | 60 | 50 |
| 4.5 | LiSCN | 60 | 50 | 40 | 30 | 95 | 95 | 95 | 90 |

The results of this test series and those of the preceding Series I unequivocally demonstrate superior effectiveness of ammonium and potassium thiocyanates over other alkali metal thiocyanates as adhesion aids in asphalt emulsion-sand mixes, and, particularly, the effectiveness of the preferred ammonium thiocyanate in improving the coating in the Sand-Mixing Test.

Again in the same test with other salts, potassium thiocyanate is observed to behave very much like ammonium thiocyanate and to contribute to the better asphalt coating of the sand, whereas sodium thiocyanate is noted to be much less effective in similarity to lithium thiocyanate. Addition of corresponding thiosulfates discloses them to behave just like the thiocyanates; ammonium and potassium salts enhance the coating of sand, whereas sodium and lithium are substantially less effective. This behavior holds true of any emulsion whether formulated with the aid of anionic, cationic, nonionic or amphoteric emulsifiers.

TEST SERIES III

The tests were carried out on an asphalt-in-water emulsion of the following composition: 65% by weight of a Venezuelan (Boscan) asphalt of 200/300 penetration. The emulsifier was the previously described amphoteric "Deriphat 160C" (0.5% by weight). The pH of the emulsifying water was adjusted to a value of 6.5. The sand was again one of Maryland origin (from Anne Arundel County). Ammonium thiocyanate and ammonium thiosulfate were added to demonstrate the improvement in mixing with said according to the invention, as shown by the data in the following table.

TABLE III

| Run No. | pH of Emulsified Water | Salt Added Weight Percent in Emulsion | Percent Sand Surface Coated after Mixing— | | | |
|---|---|---|---|---|---|---|
| | | | 1 min. | 3 min. | 4 min. | 5 min. |
| 1 | 6.5 | None | 60 | 70 | 50 | 20 |
| 2 | 6.5 | 1.0 NH₄SCN | 60 | 80 | 80 | 70 |
| 3 | 6.5 | 1.0 (NH₄)₂S₂O₃ | 60 | 65 | 60 | 40 |
| 4 | 5.5 | 1.0 (NH₄)₂S₂O₃ | 65 | 65 | 65 | 55 |
| 5 | 7.5 | 1.0 (NH₄)₂S₂O₃ | 65 | 65 | 60 | 55 |

TEST SERIES IV

In this series a similar emulsion (65% asphalt residue), this time of a different asphalt, namely, of a California (Midway) 150/200 penetration asphalt, was tested. The emulsifier was again the amphoteric "Deriphat 160C" (0.5% by weight). The pH of the emulsifying water was 6.5. Again the improvement due to the presence of ammonium thiocyanate is clearly apparent from the data in Table IV.

TABLE IV

| Run No. | Salt Added in Percent by Weight in Emulsion | Percent Sand Surface Coated After Mixing— | | | |
|---|---|---|---|---|---|
| | | 1 min. | 3 min. | 4 min. | 5 min. |
| 1 | None | 60 | 50 | 40 | 30 |
| 2 | 0.5 NH₄SCN | 65 | 65 | 65 | 65 |
| 3 | 1.0 NH₄SCN | 65 | 65 | 65 | 65 |
| 4 | 2.0 NH₄SCN | 65 | 70 | 70 | 70 |

TEST SERIES V

In this particular test series, the emulsion samples were formulated by emulsifying a California (Midway) asphalt of 150/200 penetration with the aid of an anionic emulsifier, oleoyl sarcosine, available commercially under the trademake "Sarkosyl O." For runs Nos. 1, 2 and 3 of the following Table V, 65% by weight of the asphalt was emulsified in water with the aid of 0.5% by weight of the emulsifier. Petroleum naphtha was added to the emulsion in the proportion of 10% by weight before the emulsion samples were submitted to the Sand-Mixing Test.

For runs 4 and 5 of the same Table V the emulsion was one of a Venezuelan (Boscan) asphalt, 65% by weight of which has been emulsified in water by using the same 0.5% by weight amount of "Sarkosyl O." The previously mentioned Maryland sand (from Anne Arundel County) was used in the test. The results given in Table V further bear out the effectiveness of the addition of thiocyanates according to the present invention.

TABLE V

| Run No. | Salt Added in Weight Percent in Emulsion | Percent Sand Surface Coated After Mixing— | | | |
|---|---|---|---|---|---|
| | | 1 min. | 3 min. | 4 min. | 5 min. |
| 1 | None | 50 | 40 | 35 | 30 |
| 2 | 0.5 NH₄SCN | 65 | 70 | 70 | 70 |
| 3 | 1.0 NH₄SCN | 65 | 70 | 70 | 70 |
| 4 | 2.0 NH₄SCN | 85 | 90 | 90 | 90 |
| 5 | None | 30 | 20 | 15 | 10 |

TEST SERIES VI

In this comparison series, the emulsion samples of 65% by weight of Venezuelan (Boscan) asphalt of 200/300 penetration, which has been emulsified in water with the aid of the previously mentioned anionic "Sarkosyl O" (0.5% by weight), were mixed with several different sands. One of them was the difficult-to-coat Maryland sand (Anne Arundel), mentioned hereinbefore; another one was an all-silica river bottom sand from Ottawa, Illinois; still another (Masonville sand) was a difficult-to-coat commercial blend of sands from pits in Howard and Anne Arundel Counties, Maryland; and finally, several emulsion samples were mixed with a relatively easy-to-coat California sand from around Del Monte. In all emulsion samples, the pH of the emulsifying water was first adjusted to a value of 6.5. Results of this comparison are given in Table VI and confirm the advantages of the invention.

TABLE VI

| Run No. | Salt Added in Weight Percent in Emulsion | | Sand Employed in Test | Percent Sand Surface Coated after Mixing— | | | |
|---|---|---|---|---|---|---|---|
| | | | | 1 min. | 3 min. | 4 min. | 5 min. |
| 1 | None | | Ottawa | 100 | 80 | 70 | 60 |
| 2 | $NH_4SCN$ | 1.0 | do | 100 | 95 | 90 | 80 |
| 3 | None | | Masonville | 60 | 50 | 40 | 20 |
| 4 | $NH_4SCN$ | 1.0 | do | 65 | 60 | 50 | 40 |
| 5 | None | | Del Monte | 95 | 90 | 90 | 85 |
| 6 | $NH_4SCN$ | 1.0 | do | 100 | 100 | 100 | 95 |
| 7 | $(NH_4)_2S_2O_3$ | 1.0 | Anne Arundel | 60 | 65 | 65 | 65 |
| 8 | $NH_4SCN$ | | do | 85 | 90 | 90 | 90 |
| 9 | None | | do | 50 | 40 | 35 | 30 |

TEST SERIES VII

In this test series 65% by weight of a Venezuelan (Boscan) asphalt of 200/300 penetration was emulsified in water with 0.5% by weight of anionic sodium-N-methyl-N-tall oil taurate, a material commercially available under the trademark "Igepon-TK–32." This emulsion was then tested in mixes with Maryland (Anne Arundel) sand. The pH of the emulsifying water in this series was adjusted to 6.5. Again, introduction of ammonium thiocyanate improves adhesion, as shown by Table VII.

TABLE VII

| Salt Added percent by wt. | | Percent Sand Surface Coated after Mixing— | | | |
|---|---|---|---|---|---|
| | | 1 min. | 3 min. | 4 min. | 5 min. |
| $NH_4SCN$ | 1.0 | 80 | 75 | 70 | 60 |
| None | | 90 | 60 | 50 | 40 |

TEST SERIES VIII

In still another series, emulsions were formulated by emulsifying 65% by weight of a Venezuelan (Boscan) asphalt of 200/300 penetration with the aid of 0.4% by weight of C-cetyl betaine, an amphoteric emulsifying agent sold by Du Pont de Nemours & Co. under the designation of "Du Pont BCO." The pH of the emulsifying water was adjusted to 6.5, and the sand again was the difficult-to-coat Maryland sand (Anne Arundel). The results of this test series shown in the next table again confirmed the effectiveness of ammonium thiocyanate as an adhesion aid for coating the surface of the sand.

TABLE VIII

| Run No. | Salt Added Percent by Wt. | Percent Sand Surface Coated after Mixing— | | | |
|---|---|---|---|---|---|
| | | 1 min. | 3 min. | 4 min. | 5 min. |
| 1 | None | 80 | 85 | 60 | 30 |
| 2 | 0.5 $NH_4SCN$ | 70 | 70 | 65 | 50 |
| 3 | 1.0 $NH_4SCN$ | 75 | 80 | 75 | 65 |

Many more test results which bring out the effectiveness of the preferred thiocyanates and thiosulfates as adhesion aids in paving mixes of asphalt emulsions and sand, and, particularly, the effectiveness of the corresponding ammonium salts, could be further adduced to illustrate the invention. It is believed, however, that the data offered hereinabove are adequate in demonstrating the improvement achieved by the addition to bituminous emulsions of the particular thiocyanates and thiosulfates in amounts ranging from above 0.25 to about 5.0% by weight, and preferably from about 0.5 to about 5.0% by weight, based on the emulsion, when such an emulsion is mixed with sand for use in paving work.

I claim:
1. A bituminous emulsion of the oil-in-water type, suitable for use in paving mixes of sand and bitumen, comprising from about 50 to about 75% by weight of a bitumen, as a dispersed phase; an emulsifying agent in an amount sufficient to emulsify said bitumen in water; from 0.25 up to about 5.0% by weight of a salt selected from the group consisting of potassium thiocyanate and ammonium thiosulfate, as an adhesion aid for said bitumen; and, as the continuous phase, water to make up 100% by weight of the emulsion.

2. A bituminous emulsion of the oil-in-water type, suitable for use in paving mixes of sand and bitumen, comprising from about 50 to about 75% by weight of a bitumen, as a dispersed phase; an emulsifying agent in an amount sufficient to emulsify said bitumen in water; from 0.25 up to about 5.0% by weight of potassium thiocyanate, as an adhesion aid for said bitumen; and, as the continuous phase, water to make up 100% by weight of the emulsion.

3. A bituminous emulsion of the oil-in-water type, suitable for use in paving mixes of sand and bitumen, comprising from about 50 to about 75% by weight of a bitumen, as a dispersed phase; an emulsifying agent in an amount sufficient to emulsify said bitumen in water; from 0.25 up to about 5.0% by weight of ammonium thiosulfate, as an adhesion aid for said bitumen; and, as the continuous phase, water to make up 100% by weight of the emulsion.

References Cited by the Examiner

UNITED STATES PATENTS 2,615,818  10/1952  McCoy _____ 106—277
2,615,851  10/1952  Manzer _____ 106—277 XR ALEXANDER H. BRODMERKEL, *Primary Examiner.*

J. B. EVANS, *Assistant Examiner.*